United States Patent Office 2,897,194
Patented July 28, 1959

---

2,897,194

NITRATES OF DEXTRANIC ACID AND PROCESS THEREFOR

Leo J. Novak, Dayton, Ohio, assignor to The Commonwealth Engineering Company of Ohio, Dayton, Ohio, a corporation of Ohio No Drawing. Application May 20, 1954
Serial No. 431,267

5 Claims. (Cl. 260—235)

This invention relates to nitrates of dextranic acid.

Dextranic acid is an organic acid which may be obtained in other ways, but which occurs during the partial hydrolysis of high molecular weight dextran by an enzyme elaborated by molds of the genus Aspergillus, notably *Aspergillus wentii*, when the dextran of high molecular weight is subjected to the splitting action of the enzyme in aqueous media. As disclosed in the pending application of L. J. Novak et al., Serial No. 377,232, filed August 28, 1953, now Patent No. 2,841,578, when, the enzyme elaborated by A. Wentii is introduced into an aqueous solution of high molecular weight dextran to be split, and allowed to act thereon until the dextran is hydrolyzed to the desired lower molecular weight, the carboxylated polymer, dextranic acid, is produced in the aqueous solution as a by-product of the splitting. As further disclosed in said pending application, the hydrolyzed dextran can be precipitated from the hydrolysis solution at pH 1.0 to 5.0 by the addition of a water-miscible aliphatic alcohol, leaving the dextranic acid in the alcoholic supernatant, from which it can be recovered as a white powder by adjusting the pH of the supernatant to a value in the range 8.0 to 13.9, preferably about 11.0, with 50% methanolic sodium hydroxide to precipitate sodium dextranate as a white powder, redissolving the salt in water at neutral or acid pH, adding an equal amount of lower aliphatic alcohol to the solution, and alkalinizing the alcohol-water mixture to a pH of about 12.0 to precipitate the dextranic acid.

The dextranic acid, usually having a molecular weight between 1000 and 50,000 as determined by light-scattering measurements, forms aqueous solutions of comparatively low relative and intrinsic viscosity.

The present application is concerned with nitrates of dextranic acid. The process of nitration may be carried out in the cold, using fuming nitric acid. The reaction proceeds rapidly with the production of an acid soluble dextranic acid nitrate and an acid-insoluble nitrate, but can be stopped by the addition of ice to the reaction mass, whereby the mass is diluted with termination of the reaction and precipitation of the acid-insoluble nitrate. The acid-soluble nitrate which remains in solution in the diluted nitric acid may be isolated therefrom by neutralization, evaporation and dialysis.

The proportion of acid-soluble nitrate to acid-insoluble nitrate resulting from the reaction varies with the molecular weight of the dextranic acid. If the latter has a molecular weight in the lower limits of the range 1000 to 50,000, say a molecular weight of 1000 to 25,000, the acid-soluble nitrate predominates, with relatively little if any of the acid-insoluble nitrate being formed. On the other hand when dextranic acid of the higher molecular weight (dextranic acid of higher viscosity) is used as starting material, the acid-insoluble nitrate is formed in substantial amount which may be as high as 85%. The nitrated dextranic acid, whether acid soluble or acid insoluble, can usually be salted out from neutral solution, for instance by ammonium sulfate. Salting out of the nitrates is usually expedited in the presence of pyridine, and when the latter is added to the mass may be accomplished by lower concentration of ammonium sulfate.

The dextranic acid nitrates may be denitrated by reaction thereof with alcoholic sodium or potassium hydroxide at ordinary temperatures. Or alcoholic alkali, methanolic potash, isopropyl alcoholic potash or methanolic caustic soda may be used to effect the denitration. Dilute solutions of alkali metal hydroxides in other lower aliphatic alcohols, as well as in water-soluble organic solvents of the type of acetone and dioxane are also useful as denitrating media. The denitration is preferably a partial de-esterification which may be carried out to the extent that the denitrated product has a nitrogen content of at least 0.1% to 0.5%.

Certain embodiments of the invention are described in detail in the following examples which are intended as illustrative, only, and not as limitative of the invention.

*Example I*

Dry dextranic acid is cooled in a freezing mixture to about —10° C. About sixty parts of fuming nitric acid (sp. g. 1.59) also cooled to —10° C. are added to the cold dextranic acid and the mixture is maintained at —10° C. for 15 minutes with occasional stirring. From 300 to 400 parts of ice are added with vigorous stirring, whereupon the temperature falls and a white curd-like material separates from the fluid. When the ice has melted, and no more undiluted nitric acid exists in the curd, the mixture is centrifuged for a few minutes and the solid is washed three or four times on the centrifuge with ice water. It is kneaded carefully each time to free it as far as possible from nitric acid, the washing being continued until the wash water is neutralized by a drop or two of 0.1 N sodium hydroxide. The washed solid is then suspended in water and dissolved by the addition of sodium hydroxide to pH 6–7. The resulting viscous fluid comprises the acid-insoluble dextranic acid nitrate.

The supernatant liquids are mixed and, while maintaining the mixture at —10° C., it is neutralized by adding 20% sodium hydroxide with continuous stirring and cooling so that the temperature during the neutralization does not exceed 20° C. At pH 6, the fluid is concentrated by heating until crystallization of sodium nitrate sets in, after which it is dialyzed for 10–20 hours to remove most of the nitrate, again concentrated, and again dialyzed. The resulting thoroughly dialyzed solution comprises the acid-soluble dextranic acid nitrate and sodium salt thereof.

If, as is assumed, dextranic acid is a carboxylated material comprising a chain of anhydroglucopyranosidic units or residues, it has three available or free hydroxyl groups per each of such units, and therefore a trinitrate and the sodium salt thereof may be formed.

The acid-insoluble nitrate of this example has a nitrogen content usually exceeding 3.6% (D.S. greater than 0.5), and the acid-soluble nitrate has a nitrogen content usually less than 3.6% (D.S. less than 0.5).

*Example II*

A dextranic acid is treated as in Example I, except that 5–10 parts of $P_2O_5$ are added to the fuming $HNO_3$, and the dextranic acid is added in small equal increments of smallest particle size (200–300 mesh) with vigorous agitation, to yield a nitrated product containing 11.5% of nitrogen (D.S. greater than 2.0 and less than 3.0).

*Example III*

A dextranic acid is nitrated and worked up as in Example I to obtain a nitrated product having a nitrogen content of 0.983% (D.S. of 0.1).

The nitrates of the invention can be partially de-nitrated without any substantial degradation by exposing them to the action of alkali in the presence of alcohol.

*Example IV*

The nitrated product of Example I is denitrated in alcoholic potassium hydroxide (2.5 gr./l.) for 95 minutes to obtain a product containing about 0.1% nitrogen.

The nitrated and partially de-nitrated dextranic acids are useful for various purposes but are particularly valuable for the inhibiting effect they exert on the specific enzyme, hyaluronidase. This enzyme exists in certain bacteria, venoms, spermatozoa and other sources and performs a function in the process of invasion of cells and tissues by depolymerizing or hydrolyzing hyaluronic acid, an important substance of connective tissue. Inhibitors of the depolymerizing action of hyaluronidase on hyaluronic acid are of interest for various purposes.

Inhibition of the depolymerizing action of hyaluronidase on hyaluronic acid by the nitrated and partially de-nitrated dextranic acids can be determined in the known way, by mixing a suitable amount of the nitrated dextranic acid with hyaluronic acid and then adding 50 micrograms of hyaluronidase per 4 ml. of the solution. The tests may be conducted at 25° C. with hyaluronic acid having a relative viscosity of 7-8 for a 1.0 gm./l. solution in 0.05 M sodium chloride and 0.05 M pH 7 phosphate buffer or with smaller concentrations of the phosphate buffer. Hyaluronic acid having a relative viscosity as low as 2 for the 1.0 gm./liter solution may be used. Hyaluronidase from bull testes may be used at 12.5 mg./l., or using larger or smaller concentrations of the enzyme at 37° C. The depolymerization of hyaluronic acid by the hyaluronidase is accompanied by a drop in the viscosity of the hyaluronic acid solution, the time required for the viscosity to fall halfway from the initial to the caluculated or presumed final value being taken as a measure of the rate of enzyme action. The extent to which the nitrated dextranic acid inhibits the action of the hyaluronidase on the hyaluronic acid is gauged by the extent and rate of the decrease in viscosity of the solution containing the hyaluronic acid, the hyaluronidase and the nitrated dextranic acid.

Various modifications may be made in practicing the invention, including the use of a smaller ratio of nitric acid to dextranic acid, a shorter nitration time, and so on. Since such modifications may be made in the details exemplified within the scope of the disclosure and the spirit of the invention, it is to be understood that it is not intended to limit the invention except as it is defined in the appended claims.

What is claimed is:

1. As a new composition of matter, a nitrate of the carboxylated polymer obtained by introducing the dextran-splitting enzyme produced by the mold *Aspergillus wentii* into an aqueous solution of dextran of relatively high molecular weight, holding the solution until the dextran is split into segments of relatively low molecular weight by the action of the enzyme, precipitating and separating the hydrolyzed dextran from the solution, and recovering the carboxylated polymer formed as by-product in the dextran-splitting from the supernatant, said nitrate being prepared by reacting said carboxylated polymers with fuming nitric acid at a temperature of about −10° C., and having an average degree of substitution with respect to nitrate groups between about 0.1 and about 2.0.

2. The process for producing a nitrate of the carboxylated polymer obtained by introducing the dextran-splitting enzyme produced by the mold *Aspergillus wentii* into an aqueous solution of dextran of relatively high molecular weight, holding the solution until the dextran is split into segments of relatively low molecular weight by the action of the enzyme, precipitating and separating the hydrolyzed dextran from the solution, and recovering the carboxylated polymer formed as by-product in the dextran-splitting from the supernatant, which comprises reacting the carboxylated ploymer with fuming nitric acid at a temperature of about −10° C. until an acid-insoluble nitrate of the polymer is produced, and isolating said nitrate from the reaction mass.

3. The process for producing mixed acid-soluble and acid-insoluble nitrates of the carboxylated polymer obtained by introducing the dextran-splitting enzyme produced by the mold *Aspergillus wentii* into an aqueous solution of dextran of relatively high molecular weight, holding the solution until the dextran is split into segments of relatively low molecular weight by the action of the enzyme, precipitating and separating the hydrolyzed dextran from the solution, and recovering the carboxylated polymer formed as by-product in the dextran-splitting from the supernatant, which comprises mixing the carboxylated polymer and fuming nitric acid together at a temperature of about −10° C., holding the mixture at that temperature until mixed acid-insoluble and acid-soluble nitrates of the polymer are formed and the acid-insoluble nitrate precipitates, separating the acid-insoluble nitrate, adding an alkali metal hydroxide to the supernatant, at a temperature between −10° C. and 20° C., to a pH of about 6.0, concentrating the solution by heating until crystallization of alkali metal nitrate is initiated, and dialyzing the solution to recover the acid-soluble nitrate of the polymer.

4. The process according to claim 3, characterized in that the supernatant containing the acid-soluble nitrate of the polymer is neutralized with sodium hydroxide.

5. The process for producing a nitrate of the carboxylated polymer obtained by introducing the dextran-splitting enzyme produced by the mold *Aspergillus wentii* into an aqueous solution of dextran of relatively high molecular weight, holding the solution until the dextran is split into segments of relatively low molecular weight by the action of the enzyme, precipitating the hydrolyzed dextran from the solution, and recovering the carboxylated polymer formed as by-product in the dextran-splitting from the supernatant, which nitrate contains from about 0.1% to about 0.5% of combined nitrogen, which comprises mixing the polymer with fuming nitric acid at a temperature of about −10° C., holding the mixture until a solid comprising an acid-insoluble nitrate of the polymer precipitates, separating the acid-insoluble nitrate, and treating said nitrate with alcoholic alkali metal hydroxide at ordinary temperature until the nitrogen content thereof is reduced to about 0.1% to about 0.5%.

References Cited in the file of this patent

UNITED STATES PATENTS

| | | |
|---|---|---|
| 1,922,123 | Crater | Aug. 15, 1933 |
| 2,297,734 | Wyler et al. | Oct. 6, 1942 |
| 2,671,779 | Gaver et al. | Mar. 9, 1954 |

FOREIGN PATENTS

| | | |
|---|---|---|
| 14,625 | Great Britain | 1890 |
| 12,316 of 1899 | Great Britain | May 5, 1900 |